Sept. 28, 1937.  R. W. WAGNER  2,094,421
POWER TAKE-OFF
Filed Feb. 8, 1937  2 Sheets-Sheet 1
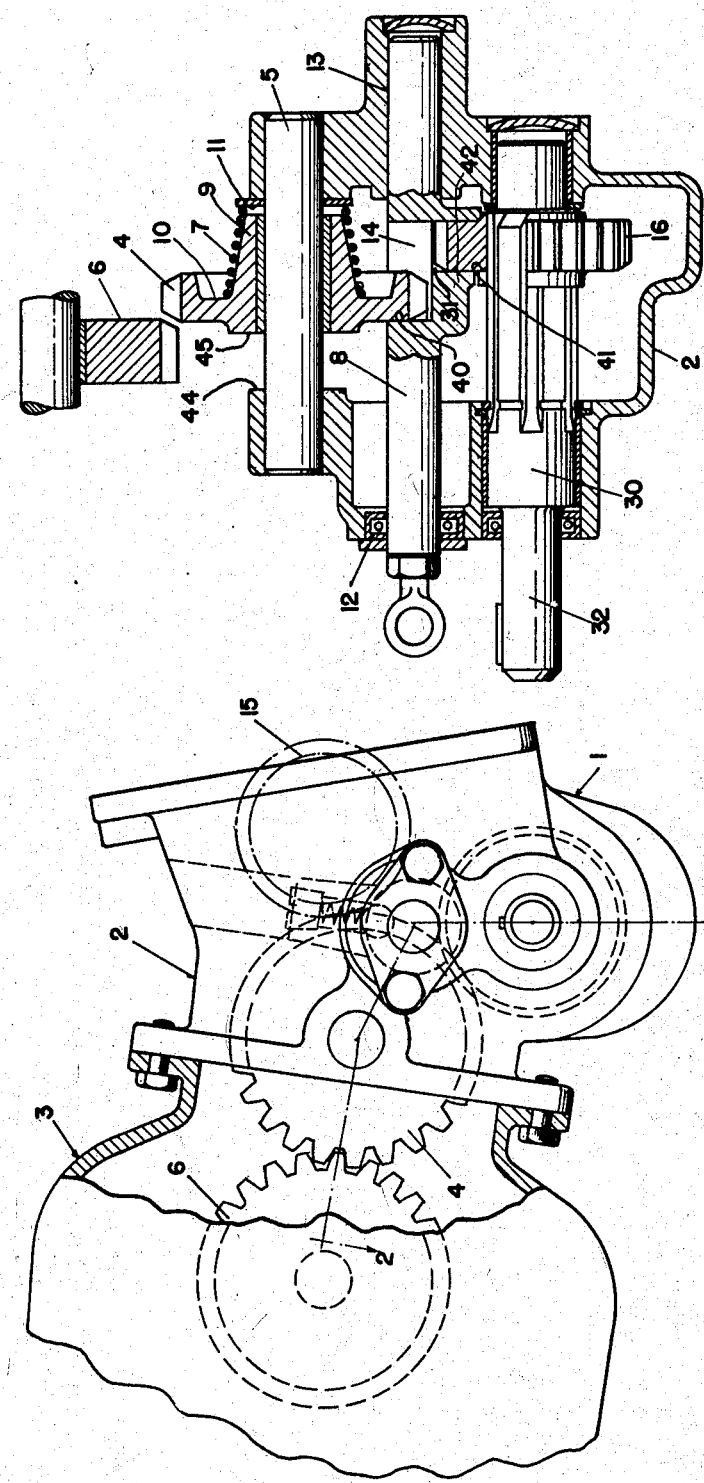
INVENTOR
ROBERT. W. WAGNER
BY *Whittemore, Hulbert & Belknap*
ATTORNEYS

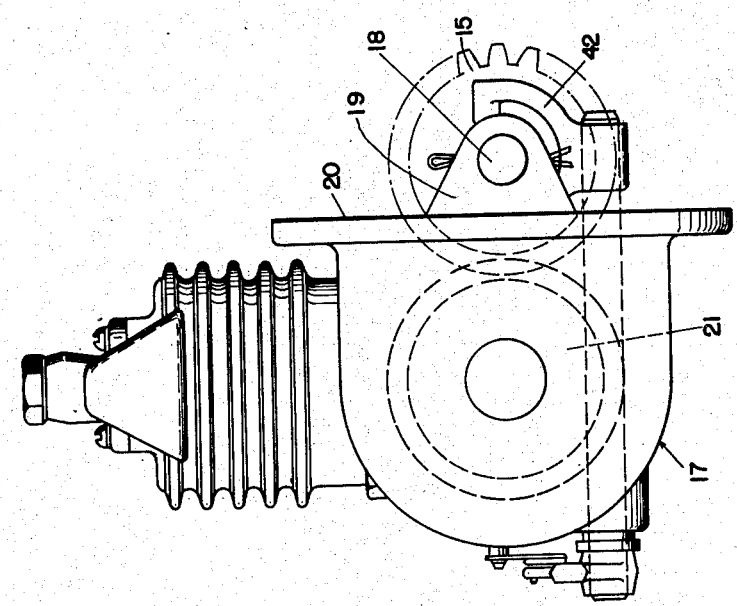
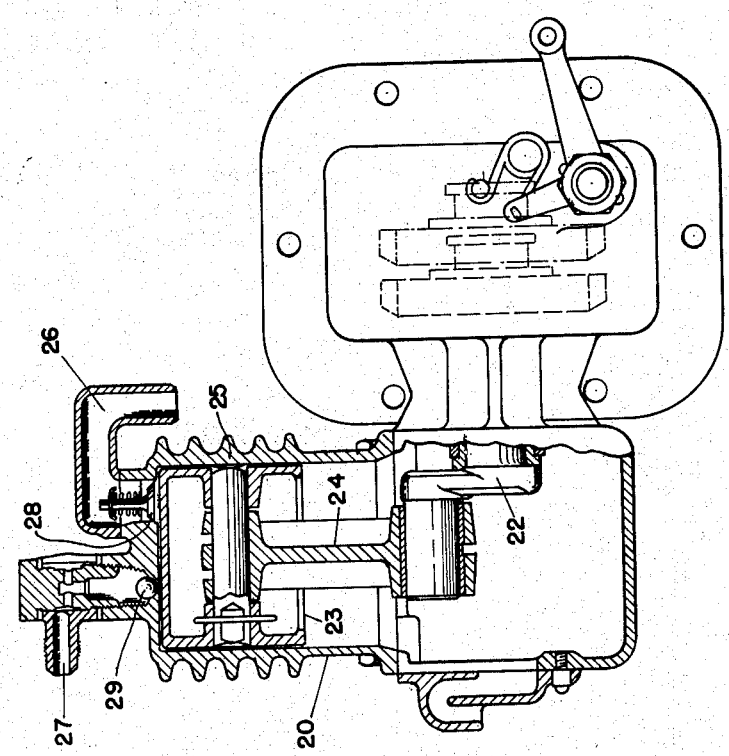

Patented Sept. 28, 1937

2,094,421

UNITED STATES PATENT OFFICE 2,094,421

POWER TAKE-OFF

Robert W. Wagner, Detroit, Mich., assignor to Detroit Harvester Company, Detroit, Mich., a corporation of Michigan Application February 8, 1937, Serial No. 124,749

15 Claims. (Cl. 74—11)

This invention relates generally to power take-off devices for motor vehicles, and refers more particularly to devices wherein provision is made for driving from a common source of power such as the transmission of the motor vehicle, different kinds of equipment such as an air compressor and a hoist.

One of the essential objects of the invention is to provide a device of the type mentioned wherein a power take-off idler gear may, at will, be engaged with or disengaged from a gear of the transmission.

Another object is to provide a device wherein two gears operable respectively for driving the hoist and air compressor, may be alternately engaged with the idler gear aforesaid to be driven thereby while it is in mesh with the transmission gear, so that said hoist and air compressor may operate independently of each other.

Another object is to provide the idler gear and one of the two last mentioned driving gears with a common shifter mechanism, wherein provision is made for initially causing said driving gear to remain inoperative while the idler gear is engaged with the transmission gear, and for subsequently causing said driving gear to be engaged with the idler gear while the latter is in engagement with the transmission gear.

Other objects, advantages and novel details of construction of this invention will be made more apparent as this description proceeds, especially when considered in connection with the accompanying drawings, wherein:

Figure 1 is a side elevation of a power take-off device embodying my invention and showing the transmission housing of a motor vehicle broken away and in section;

Figure 2 is a sectional view taken substantially on the line 2—2 of Figure 1;

Figure 3 is an elevation of the air compressor unit;

Figure 4 is a view taken at substantially right angles to Figure 3 with parts broken away and in section.

Referring now to the drawings, 1 is a power take-off device embodying my invention having a housing 2 attachable to a transmission housing 3 of a motor vehicle and containing an idler gear 4 that is slidable on a stationary shaft 5 to and from engagement with a suitable gear 6 of the transmission.

7 is a coil spring for moving the idler gear 4 into engagement with the transmission gear 6 and 8 is a sliding shaft of my shifter mechanism for moving the idler gear 4 out of engagement with the transmission gear. As shown, the spring 7 is sleeved upon a lateral extension 9 of the gear 4 between a side 10 of the latter and an abutment 11 on the stationary shaft 5. The sliding shaft 8 is movable in suitable bearings 12 and 13 respectively in the housing 2 and has an elongated slot 14 receiving a portion of the idler gear 4. Any suitable mechanism (not shown) may be employed for sliding the shaft 8 back and forth in the bearings 12 and 13.

15 and 16 respectively are two gears engageable with the idler gear 4 while the latter is in mesh with the transmission gear 6 for driving respectively an air compressor 17 and a hoist (not shown). Preferably the gear 15 is located within the housing 2 but is slidable on a stationary shaft 18 carried by portions 19 of the air compressor casing 20. As shown, this casing 20 is fastened to the power take-off housing 2 and contains a gear 21 constantly in mesh with the gear 15, a crank shaft 22 operable by the gear 21, a piston 23 and a connecting rod 24. A cylinder 25 for the piston 23 may have any suitable inlet and outlet passages 26 and 27 respectively for air, provided with valves such as 28 and 29 respectively, as desired.

The gear 16 is splined upon a rotating shaft 30 in the housing 2, and is received in a short or narrow slot 31 in the shifter shaft 8. Any suitable mechanism (not shown) may be connected to the exposed end 32 of the rotating shaft 30 for driving the hoist referred to.

In use, the elements within the power take-off housing 2 are normally in the position illustrated in Figure 2. When it is desired to drive either the air compressor 17 or the hoist, the shifter mechanism is operated so that the shifter shaft 8 will be moved to the left. Upon initial movement of the sliding shifter shaft 8 to the left, the gear 4 will be moved by the spring 7 into driving engagement with the transmission gear 6. At the same time gear 16 is moved by the shaft 8 to the left on shaft 30. However, upon this initial movement of the shaft 8 the gear 16 is still disengaged from gear 4, because the relative position of said gears 4 and 16 in engagement with the walls 40 and 41 respectively of the slots 14 and 31 in the shifter shaft, is maintained. Thus while gear 4 is in mesh with gear 6, and gear 16 is out of mesh with gear 4, it is possible to shift gear 15 by a suitable shifter fork such as 42 into mesh with gear 4 to cause the piston 23 of the air compressor to be operated from the transmission gear 6. Upon further movement of the shifter shaft 8 to the left, the gear 16 will be engaged with the gear 4 so that shaft 30 will be driven from the transmission gear 6. In this connection it should be noted that a portion 44 of the housing 2 forming one of the supports for the stationary shaft 5 constitutes an abutment for the hub 45 of the gear 4 when moved to the left. Hence, when gear 16 is finally moved by the shifter shaft 8 into engagement with the gear 4, the latter will be held against further movement to the left by the abutment 44. As a result, the proper engagement of gear 16 with the gear 4 may be made while the latter is in mesh with gear 6. When gear 16 is moved into engagement with gear 4, the spring 7 will maintain proper engagement of gear 4 with gear 6.

When the shifter shaft 8 is moved to the right, the elongated slot 14 will permit the gear 4 to be held by the spring 7 in mesh with gear 6 until gear 16 is moved by the wall 41 of slot 31 in shaft 8 out of mesh with gear 4. Continued movement of the shaft 8 to the right will cause gear 4 to be moved by the wall 40 of slot 14 in shaft 8 out of mesh with gear 6, so that the parts will resume the position illustrated in Figure 2.

What I claim as my invention is:

1. In a power take-off device, two gears operable independently of each other for driving equipment, and an idler gear movable into and out of engagement with a transmission gear and adapted while in engagement with said transmission gear to be engaged by either of the two gears aforesaid.

2. In a power take-off device, an idler gear movable into and out of engagement with a transmission gear, a gear operable to drive a predetermined type of equipment, and shifter mechanism operable to initially cause the idler gear to be moved into engagement with the transmission gear and to subsequently cause the drive gear to be moved into engagement with the idler gear.

3. In a power take-off device, two gears operable independently of each other to drive equipment, independent shifter mechanisms for said gears, and a common source of power for said gears including an idler gear movable into and out of engagement with a transmission gear, and under the control of one of the shifter mechanisms aforesaid.

4. In a power take-off device, an idler gear movable into and out of engagement with a transmission gear, shifter mechanism for said idler gear including a spring for moving said idler gear into engagement with the transmission gear, and a manually operable member for moving said idler gear out of engagement with said transmission gear, and means engageable with said idler gear while in engagement with said transmission gear for operating a predetermined kind of equipment.

5. In a power take-off device, an idler gear movable into and out of engagement with a transmission gear, and a gear movable into engagement with said idler gear while it is in engagement with said transmission gear for operating a predetermined kind of equipment.

6. In a power take-off device, an idler gear movable into and out of engagement with a transmission gear, shifter mechanism for said idler gear including a slidable shifter shaft, and means for driving a predetermined kind of equipment including a gear adapted to mesh with said idler gear and movable by said shifter shaft relative to said idler gear.

7. In a power take-off device, an idler gear movable into and out of engagement with a transmission gear, a gear for driving a predetermined kind of equipment movable into and out of engagement with the idler gear, and shifter mechanism for said idler and driving gears including a slidable shifter shaft having slots receiving said gears, the slot receiving the idler gear being elongated to permit movement of said shaft and driving gear relative to said idler gear.

8. In a power take-off device, an idler gear movable into and out of engagement with a transmission gear, a gear for driving a predetermined kind of equipment movable into and out of engagement with the idler gear, and shifter mechanism for said idler and driving gears including a slidable shifter shaft, and a coil spring, said shifter shaft having a lost motion connection with said idler gear and a relatively close connection with said driving gear, and said spring being operable to take up lost motion between said idler gear and shifter shaft during a predetermined movement of the latter.

9. In a power take-off device, an idler gear movable into and out of engagement with a transmission gear, a gear for driving a predetermined kind of equipment movable into and out of engagement with the idler gear, and shifter mechanism for said idler and driving gears including a slidable shifter shaft, and a coil spring, said shifter shaft having a relatively close connection with said driving gear and a lost motion connection with said idler gear permitting movement of the shifter shaft and driving gear relative to the idler gear, and the spring being operable to positively move the idler gear when the shifter shaft is moved in one direction and to take up lost motion between the idler gear and shaft when the shaft is moved in the opposite direction.

10. In a power take-off device, two independent driving gears, an idler gear adapted to move into and out of engagement with a transmission gear and constituting a common source of power for said driving gears, and means for shifting said driving gears into engagement with said idler gear.

11. In a power take-off device, two independent driving gears, an idler gear adapted to move into and out of engagement with a transmission gear and constituting a common source of power for said driving gears, means for moving one of said driving gears into engagement with said idler gear, and means for moving the other of said driving gears into engagement with said idler gear, one of said means also being adapted to shift the idler gear relative to the transmission gear.

12. In a power take-off device, two independent driving gears, an idler gear adapted to move into and out of engagement with a transmission gear and constituting a common source of power for said driving gears, and means operable while said idler gear is in engagement with the transmission gear for shifting said driving gears into and out of engagement with said idler gear.

13. In a power take-off device, a power take-off shaft, a shaft substantially parallel to said power take-off shaft, an idler gear on the last mentioned shaft and adapted to move into and out of engagement with a transmission gear, a gear splined upon the power take-off shaft and movable into and out of engagement with said idler gear, and shifter mechanism operable to initially cause the idler gear to be moved into engagement with the transmission gear and to subsequently cause the splined gear to be moved into engagement with the idler gear.

14. In a power take-off device, a power take-off shaft, a shaft substantially parallel to said power take-off shaft, an idler gear on the last mentioned shaft and adapted to move into and out of engagement with a transmission gear, a gear splined upon the power take-off shaft and movable into out of engagement with said idler gear, shifter mechanism operable to one position to permit the idler gear to be moved into engagement with the transmission gear and operable to a second position to cause the splined gear to be moved into engagement with the idler gear, and yieldable means operable when the shifter mechanism is in the first position mentioned to move the idler gear into engagement with the transmission gear, said shifter mechanism being operable to move the splined gear out of engagement with the idler gear and to move the latter out of engagement with the transmission gear.

15. In a power take-off device, a power take-off shaft, a shaft substantially parallel to said power take-off shaft, an idler gear on the last mentioned shaft and adapted to move into and out of engagement with a transmission gear, a gear splined upon the power take-off shaft and movable into and out of engagement with said idler gear, shifter mechanism operable to one position to permit the idler gear to be moved into engagement with the transmission gear and operable to a second position to cause the splined gear to be moved into engagement with the idler gear, yieldable means operable when the shifter mechanism is in the first position mentioned to move the idler gear into engagement with the transmission gear, a second gear shiftable into and out of engagement with the idler gear when the latter is in engagement with the transmission gear, and means operable when the shifter mechanism aforesaid is in the first position mentioned to move the second gear into engagement with said idler gear.

ROBERT W. WAGNER.